(12) United States Patent
Gray

(10) Patent No.: US 6,259,703 B1
(45) Date of Patent: Jul. 10, 2001

(54) TIME SLOT ASSIGNER FOR COMMUNICATION SYSTEM

(75) Inventor: Thomas Gray, Kanata (CA)

(73) Assignee: Mitel Corporation, Kanata (CA)

( * ) Notice: Subject to any disclaimer, the term of this patent is extended or adjusted under 35 U.S.C. 154(b) by 0 days.

(21) Appl. No.: 09/361,892

(22) Filed: Jul. 27, 1999

Related U.S. Application Data

(63) Continuation of application No. 08/851,422, filed on May 5, 1997, which is a continuation-in-part of application No. 08/326,862, filed on Oct. 21, 1994, now abandoned.

(30) Foreign Application Priority Data

Oct. 22, 1993 (CA) .................................................. 2109007

(51) Int. Cl.⁷ ............................ H04Q 11/00; H04L 12/43
(52) U.S. Cl. ........................... 370/458; 370/360; 370/362
(58) Field of Search ..................................... 370/360, 361, 370/362, 363, 364, 365, 366, 376, 458

(56) References Cited

U.S. PATENT DOCUMENTS

| | | | |
|---|---|---|---|
| 4,601,029 | * | 7/1986 | Hargrave et al. ........................ 370/67 |
| 4,799,216 | * | 1/1989 | Johnson et al. .......................... 370/67 |
| 5,450,401 | * | 9/1995 | Tatsuki et al. ............................ 370/68 |
| 5,463,671 | * | 10/1995 | Marsh et al. ............................ 379/56 |
| 5,953,330 | * | 9/1999 | Canniff et al. ......................... 370/352 |

FOREIGN PATENT DOCUMENTS

| | | | |
|---|---|---|---|
| 2076144 | 2/1993 | (CA) | ................................ H04Q/1/24 |
| 1402826 | 8/1975 | (DE) | ................................ H04J/3/16 |
| 1417300 | 12/1975 | (DE) | ............................. H04M/11/06 |
| 1511464 | 5/1978 | (FR) | .............................. H04Q/11/04 |

* cited by examiner

*Primary Examiner*—Ajit Patel
*Assistant Examiner*—Hanh Nguyen
(74) *Attorney, Agent, or Firm*—Allen, Dyer, Doppelt, Milbrath & Gilchrist, P.A.

(57) ABSTRACT

The present invention relates to a method of assigning data from time slots on an input bus to time slots on an output bus comprised of determining the order of time slots of data in a frame, determining whether each time slot of data in an input frame is to be located in the same or later time slot in an output frame, or whether it is to be located in an earlier time slot in an output frame, in the event each time slot of data of the input frame is to be located in the same or later time slot in an output frame, applying each time slot of data of the input frame to the same or a later time slot in the output frame, in the event a time slot of data of the input frame is to be located in an earlier time slot in an output frame, delaying for one time slot interval and then applying each time slot of data of the input frame to the same or a later time slot in the output frame, whereby the order of time slots in a stream of output data is always from an earlier time slot to a later time slot.

4 Claims, 3 Drawing Sheets

TIME SLOT ASSIGNER FOR COMMUNICATION SYSTEM

Figure 1:
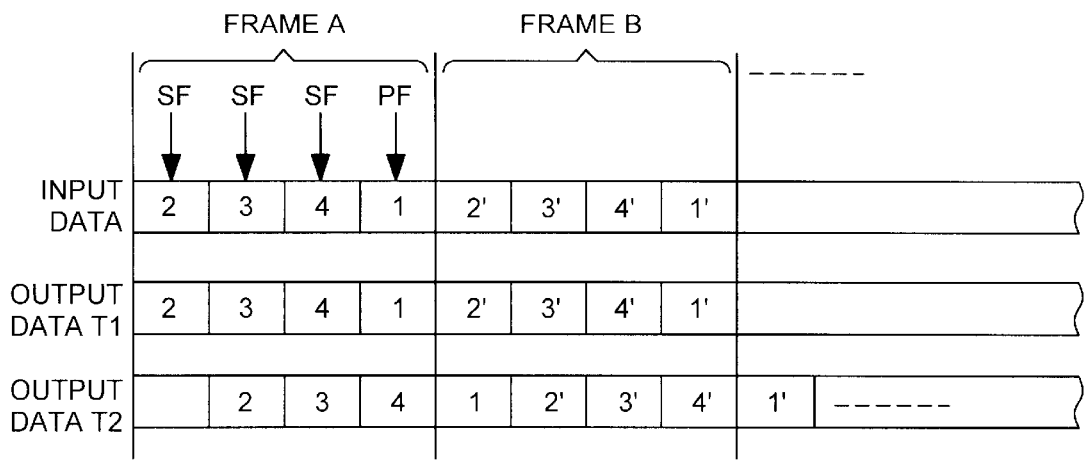

This is a continuation of application Ser. No. 08/851,422, filed May 5, 1997 pending, which is a continuation-in-part of application Ser. No. 08/326,862, filed Oct. 21, 1994, now abandoned.

FIELD OF THE INVENTION

This invention relates to communication systems, and in particular to switching systems for digital data.

BACKGROUND TO THE INVENTION

For ISDN or other applications, a communication switching system is required to switch data carried in standard time slots, each corresponding to a channel, grouped in frames. This has been typically done in ISDN systems by concatenating standard 64 kb/s channels..

Unfortunately, in many prior art switching systems, different channels in the same bit stream experienced different delays during the switching operation. This resulted in data getting out of order and becoming corrupted. Such a system is unacceptable for ISDN applications.

Data enters a switch in specific channels, and is stored. It is then switched by reading the store, and leaves the switch in different channels. Since the different output channels are not in the same sequence as the incoming channels, different delays result from the assignment of time slots to the data from that of the incoming bit stream.

One of the ways of eliminating the out of order problem due to differing delays on different channels has been to provide a constant delay to the data. In the past, this involved buffering an entire frame of data and then switching this buffered data one frame later. This provided the constant delay by giving maximum delay to all channels.

Constant delay was a requirement for data packet switches. In such systems, the packets of data were extracted from the data stream and were then switched individually through a switching mechanism.

Many inputs share a common physical interface. A protocol is established so that each of the input and output devices can share the bandwidth of the bus, but each has exclusive use of the bus during its period. Newer mechanisms allow many packets to be switched at once, but still extract the packets before switching.

SUMMARY OF THE INVENTION

The present invention assigns outgoing channels to incoming channels so that all channels are switched in order, but rather than with maximum delay as in the prior art, the present invention provides minimum delay. The present invention also allows the switching of constant bit rate channels of differing bit rates. It can provide channel assignment which preserves bit order within one frame for concatenated communication channels, and allows the assignment of incoming and outgoing channels to provide minimum delay while preserving bit ordering.

With proper alignment of delay between incoming and outgoing data streams, it is possible to provide minimum delay switching. It is also possible to provide minimum delay switching between streams of different data rates. The present invention inserts a minimum delay which needs no correction at the play-out point and so offers the minimum possible delay. Delay is an important impairment in multimedia systems and so reducing it and making it predictable are a great advantage offered by this technique.

In accordance with an embodiment of the invention, a method of assigning data from time slots on an input bus to time slots on an output bus is comprised of determining the order of time slots of data in a frame, determining whether each time slot of data in an input frame is to be located in the same or later time slot in an output frame, or whether it is to be located in an earlier time slot in the output frame; in the event each time slot of data of the input frame is to be located in the same or later time slot in an output frame, applying each time slot of data of the input frame to the same or a later time slot in the output frame; in the event a time slot of data of the input frame is to be located in the earlier time slot in an output frame, delay for one time slot interval and then apply each time slot of data of the input frame to the same or a later time slot in the output frame; whereby the order of time slots in a stream of output data is always from an earlier time slot to a later time slot.

In accordance with another embodiment, a method of assigning data from time slots on an input bus to time slots on an output bus is comprised of firstly connecting the time slots from the input bus to the time slots on the output bus in order beginning with the first of each time slot; in the event the first connecting step does not result in constant delay of time slots within a frame of data between the input and the output bus, secondly connecting the time slots from the input bus to the time slots on the output bus shifted one time slot later in time; and repeating the second connecting step until there is preservation of bit order of time slots within a frame of data between the input and the output bus.

BRIEF INTRODUCTION TO THE DRAWINGS

Figure 3:
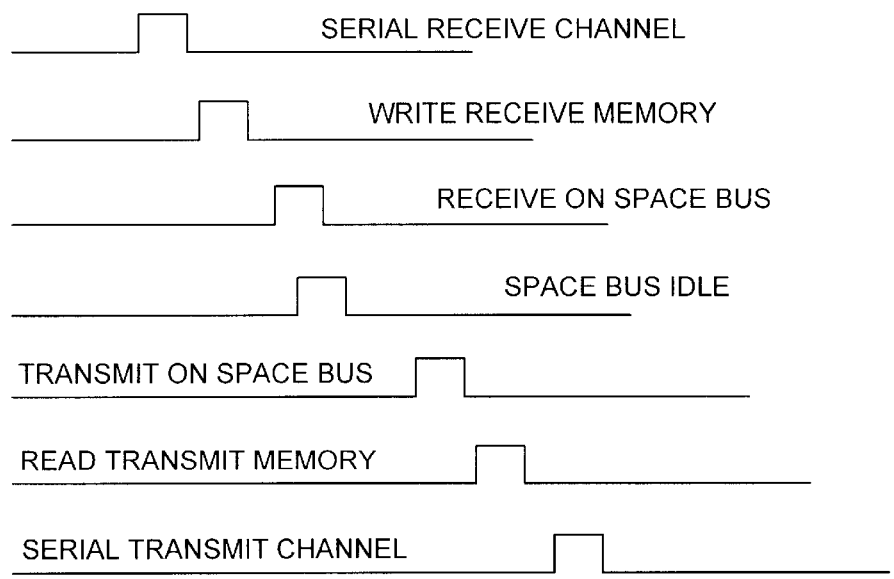
Figure 1A:
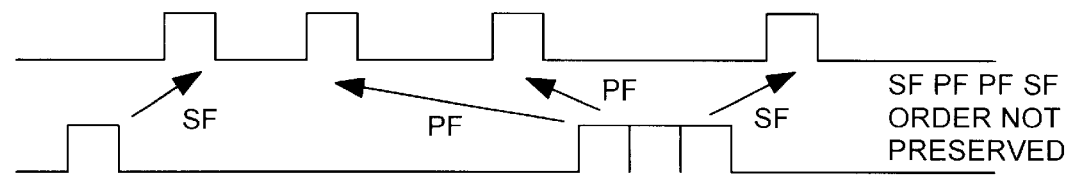
Figure 1B:
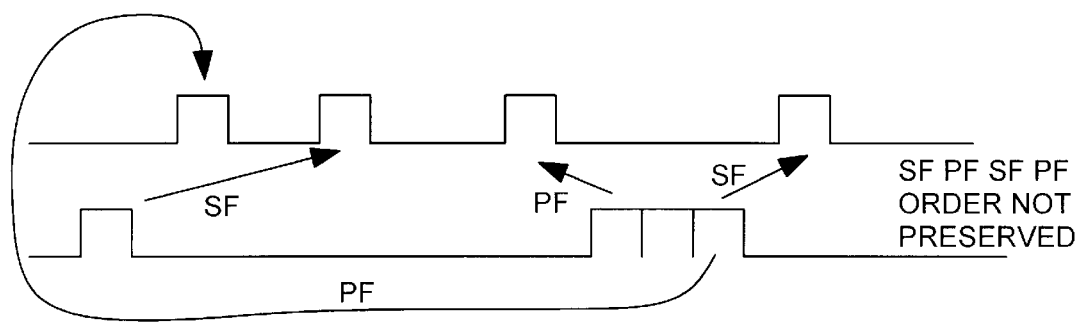
Figure 1C:
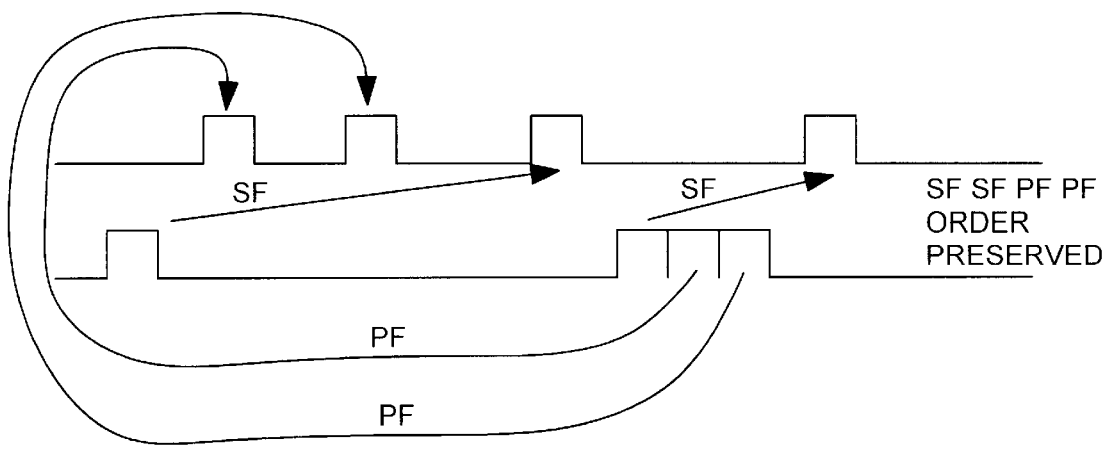
Figure 2:
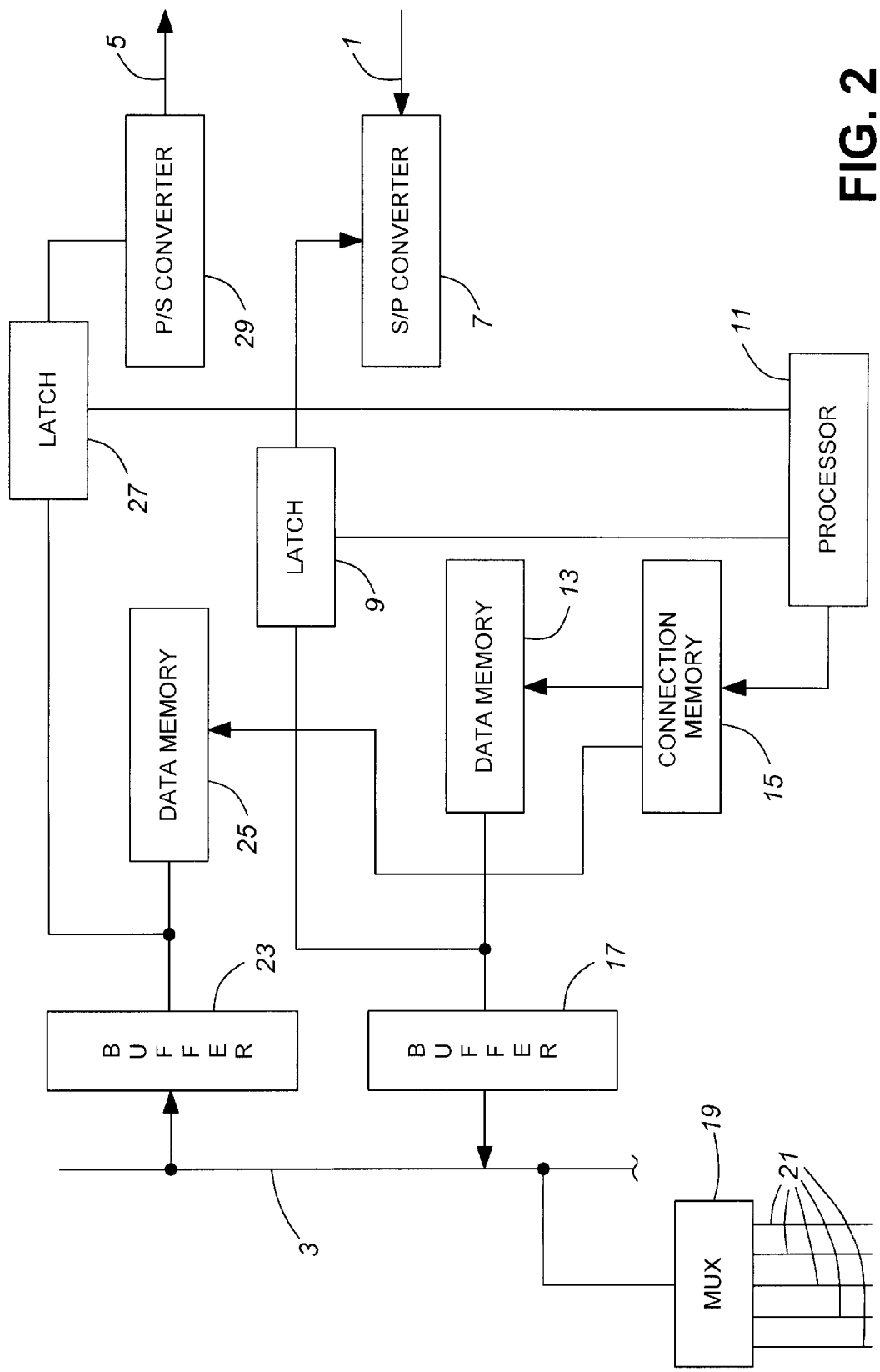

A better understanding of the invention will be obtained by reference to the detailed description below, in conjunction with the following drawings, in which:

FIG. 1 illustrates frames of input data and frames of output data relating to particular delays, FIGS. 1A, 1B and 1C illustrate frames of input data and frames of output data, the order not being preserved in FIGS. 1A and 1B and the order being preserved in FIG. 1C, FIG. 2 is a block diagram illustrating an embodiment of the invention, and FIG. 3 illustrates a timing diagram used to understand the operation of the embodiment of FIG. 2.

DETAILED DESCRIPTION OF THE INVENTION

Turning to FIG. 1, a pair of sequential frame intervals labelled frame A and frame B are illustrated. The line labelled input data illustrates four incoming time slots, carrying time slot numbers 2, 3, 4 and 1. It is desired to apply data from incoming time slots to outgoing time slots such that the data which is in order in the incoming time slots is in order in the outgoing time slots. This will be referred to below as the connection of incoming to outgoing time slots.

The assignment of time slots in the two data streams of input data and output data is arbitrary. However, as shown in FIG. 1, the incoming and outgoing frames are aligned. There is no requirement that the pattern of outgoing time slots should depend on the pattern of incoming time slots. If the data in the incoming time slots, for example, were in order by channel ABCD, connections would be made such that the outgoing data would be again be in order by channel ABCD with the minimum delay.

The system using well known methods identifies a framing pattern that is contained within the incoming data stream. Synch framing patterns may consist of special bits as in T1 or SONET, specific intended violations of line coding such as Manchester or other known framing patterns. This will synchronize the connection memory to be described later for both the incoming and outgoing frames. Circuitry of a well known type (not shown) can be used to insert the required framing pattern into the outgoing frame.

With this channel numbers can be determined by the position of the channel in the frame, earlier numbered channels being given lower numbers. The channels in the outgoing and incoming frames are aligned and so it is easy to determine the relative timing of channels by use of their channel number which is used to address them in the connection memory.

In order to understand the description below, the following is defined. A time slot is considered to be numbered greater than another time slot if it occurs later in the frame, and thus it is given a greater time slot number. A time slot is considered numbered lesser if it occurs earlier in the frame than another time slot. A connection is called SF (same frame) if it connects an incoming time slot to a greater or equal numbered outgoing time slot. A connection is called PF (previous frame) if it connects an incoming time slot with a lesser time slot. In an SF connection, the data in the outgoing frame came from the same frame on the incoming channels. In a PF connection, the data in the outgoing frame came from the immediately previous frame on the incoming channels.

A connection passes data in order if it meets the following requirements:

(a) The connections between incoming and outgoing time slots must be in sequence. The sequence may be allowed to wrap around the end of the frame, as may be seen with the numbered time slots in the input data of FIG. 1.

(b) All connections must be PF;

or

All the connections can be listed starting from the first incoming time slot in two groups with all SF connections to the left and all PF connections to the right. Thus in the input data figure shown in FIG. 1, the connections can be listed with the order of the incoming channels as SF, SF, SF, PF.

Thus the output data can be checked to determine whether there is bit order is preserved within a frame of data between the input and output bus. In order to preserve the bit order, the following steps should be effected:

(a) The incoming time slots should be connected to the outgoing time slots in order, beginning with the first of each. This is illustrated in FIG. 1, where the output data T1 with no delay shows the input time slot 2 connected to output time slot 2, input time slot 3 connected to output time slot 3, etc. It should be determined whether each time slot of data in the input frame is to be located in the same or later time slot in the output frame, or whether it is to be located in an earlier time slot in an output frame. In the event each time slot of data of the input frame is to be located in the same or later time slot in an output frame, each time slot of data of the output frame is applied to the same or a later time slot in the output frame. This does not exist in the example shown in FIG. 1.

However in the event a time slot of data of the input frame is to be located in an earlier time slot of an output frame, there should be delay for one time slot interval, and each time slot of data of the input frame should be applied to the same or later time slot in the output frame.

The time slot numbered 1 in the input data of FIG. 1 follows a higher numbered time slot, and therefore it meets the last-noted criterion. A delay is introduced, and the time slot data of the frame indicated is shifted as shown in the data line shown as OUTPUT DATA T2. It may be seen that the time slot 1 has been shifted into the first time slot of the following frame, thus rendering the time slots in the second frame, frame B, in numerical sequence. All of the time slots in frame B will thus be designated SF.

Thus it has been determined that if the incoming time slots connected to the outgoing time slots in order beginning with the first of each did not produce the desired requirements, and the incoming time slots are connected to the outgoing time slots such that the connections are shifted one time slot later in time than the previous connection.

Clearly the connection has a delay of less than one frame, and in the example shown, has a delay of only a single time slot. The delay results in the minimum possible delay for the set of time slots given.

In the event this shift does not result in preservation of bit order of time slots within a frame of data between the input and output bus, the step is repeated again, shifting one time slot at a time, until there is preserved order of time slots within a frame of data between the input and output bus.

In order to effect the above, the switching circuitry must be able to switch without substantial delay from an incoming time slot to an outgoing time slot which has the same or greater time slot number, and the switching mechanism must be able to switch from an incoming time slot to an outgoing time slot up to one frame time away.

To avoid misordering the channels in frames, an incoming channel switched to an outgoing channel with a lower number is transmitted in the next frame, while one switched to a higher outgoing channel number is transmitted in the same frame. It is imperative that data coming in an order in multiple channels be switched and retransmitted in the same order. If outgoing channels are switched in frames from the incoming channels then this ordering will not be preserved. The present invention preserves the order of incoming data after it is switched to the outgoing stream.

The illustrations of FIGS. 1A, 1B and 1C show how shifting of the switching from the incoming to the outgoing streams create the conditions in which data will be transmitted in the same order as it was received. FIGS. 1A and 1B illustrate the channel order not being preserved, and FIG. 1C illustrates preservation of the order. What matters is that the ordering is preserved, rather than the fact that shifting in time has occurred. It is important to ensure that there is no ordering such as SF-PF-SF-SF, wherein the data in the PF channel is switched in the next frame while data in the SF channels which follow is switched in the same frame thus destroying the ordering.

Considering FIGS. 2 and 3, an embodiment of a system for effecting the above, an input serial bus 1 carries frames of serial data in 8 bit bytes, each designating a time slot. A parallel bus 3 carries time slot assigned data which is to be e.g. switched in a space division switching mechanism from one bus to another.

Similarly, data received from bus 3 is time slot assigned and eventually output on serial output bus 5. Those buses can be wired, optical fiber, etc.

Bus 3 can interface a multiplexer 19 connected to e.g. 16 serial buses 21. The structure between the serial buses lands and bus parallel 3 interconnects the data carried on bus 3 with the serial data streams on buses 1 and 5. The function of this structure is to reassign data channels so that data can be transferred between the bus 3 and buses 1 and 5. In one aspect, data is created in fixed channels by interfaces connected to the buses 21 multiplexed and connected to bus 3. The fixed channels are reassigned to variable channels by the structure described herein to allow the data to be switched through a central space switch.

A channel consisting of e.g. 8 bits of data arrives on the input serial databus 1 stream. In a preferred embodiment there are 256 channels for each 125 μs frame. The data is converted from serial to parallel in S/P converter 7, and at the end of the incoming channel time, it is latched to a register 9, where it is stored for the next channel time, while the next channel is being converted from serial to parallel.

During the first half of the next channel time, the outputs of the register 9 are enabled under control of processor 11. The data stored in latch 9 is received in a memory 13. Memory 13 is 256 bytes long by 8 bits wide, and thus has sufficient capacity to hold one frame of data. Memory 13 is thus a cyclic memory which holds the last frame of data.

Under control of processor 11, a connection memory 15 generates addresses and applies those addresses to memory 13 to store the incoming data from latch 9 at locations related to the channel number of the incoming serial data stream.

During the second half of the channel time, the connection memory generates addresses relating to the time slot number of the serial channel which is to be switched to bus 3. Upon addressing memory 13 during the second half of the channel time and enabling memory 13 to read, rather than write the data as it had during the first half of the channel time, the data corresponding to the time slot number of the serial channel which is to be switched to bus 3 is read into buffer 17. The output buffer is enabled and the data is output to bus 3.

Thus by appropriately designating the output channel addresses, the data read into and stored in memory 13 can be output to bus 3 with an appropriate delay, and in a selectable sequence.

The data on bus 3 is then latched into multiplexer/demultiplexer 19, for application to appropriate serial buses 21.

The system involving transmission of data from buses 21 to serial bus 5 is similar to that described above, except in reverse. Demultiplexed data on bus 3 is applied to buffer 23, is written into frame memory 25, is read into latch 27 from memory 25, is converted from latch 27 into serial data in parallel to serial converter 29, and is output on serial data bus 5.

It will be noted that there is a difference in speed between the bus rate on bus 1 and the bus rate on buses 21. If data is to be switched to or from the same numbered channels, the reading time of memory 13 should be established so that there is the delay between the bus 21 and bus 1.

The circuit must arrange delay between the data on any of buses 21 and that on outgoing serial bus 5. The frame of the outgoing serial bus 5 should be established so that it is one input bus channel time behind the input bus 21 frame. In this way, data on e.g. channel 0 of the input bus 21 may be switched to channel 0 of the outgoing serial stream on bus 5.

With the above structure, it is possible to switch data from bus 21 to bus 5 in the same manner as previously described for data from bus 1 being switched to serial streams on buses 21.

Thus the structure described switches data from the incoming datastream from serial bus 1 to arbitrary channels on buses 21 and from channels on buses 21 to arbitrary channels in the outgoing stream on serial bus 5. This will preserve the order from the input stream to bus 21 and similarly the order of data from bus 21 to the output stream. The means to do this is the processor which has used an external signalling protocol with the distant switches to determine the selected channel numbers on bus 21 and the incoming and outgoing streams. The processor sets the required switching connections into the connection memory.

The timing illustrated in FIG. 3 facilitates sharing of the bandwidth of the parallel bus 3 by alternating its use between transmit and receive data. The internal latching of data in the transmit time slot assignor involving elements 23, 25, 27 and 29 is similar to the latching of data in the received time slot assignor involving elements 7, 9, 13 and 17.

With proper delay, it is possible to switch data between streams of different but compatible rates. For example one can set the ratio between 1:1 and 16:1 or a higher ratio.

It should be noted that the addresses generated by the connection memory 15 can be completely arbitrary. All that need occur is that each incoming channel is stored in a known location. The locations generated for the outgoing channels will be those known locations.

There could be for example, fixed incoming channels and variable outgoing channels, variable incoming channels and fixed outgoing channels, fixed incoming channels and fixed outgoing channels or variable incoming channels and variable outgoing channels. Fixed in this case designates locations fixed relative to system timing.

Where there are variable incoming to variable outgoing channels, it may be desired to switch only a few channels from serial streams containing a great many channels. In that case only those channels which are to be switched need to be stored while the others are ignored. This could allow the operation of a circuit with smaller data memories 13 and 25.

A person understanding this invention may now conceive of alternative structures and embodiments or variations of the above. All of those which fall within the scope of the claims appended hereto are considered to be part of the present invention.

I claim:

1. A method of assigning data from time slots on an input bus to time slots on an output bus of a digital data switching system comprising:

(a) connecting the time slots from the input bus at the time slots on the output bus in order beginning with the first time slot of each frame on the input bus, (b) in the event step (a) does not result in preservation of bit order of time slots within a frame of data between the input and the output bus, connecting the time slots from the input bus to the time slots on the output bus shifted one time slot later in time, and (c) repeating step (b) until there is bit order preservation of time slots within a frame of data between the input and the output bus.

2. A time slot assigner for a digital data switching system comprising:

(a) means for receiving serial data on an input bus divided into frames of time slots, (b) means for converting the data of each tome slot into parallel bytes corresponding to data channels, (c) means for storing each byte in a cycling frame memory at locations related to channel numbers of said data, and (d) means for subsequently reading selectable ones of said locations corresponding to time slot numbers of data on an output bus, assignment of said data being determined by (i) connecting the time slots from the input bus to the time slots on the output bus in order beginning with the first slot of each frame on the input bus, (ii) in the event step (i) does not preserve bit order of time slots within a frame of data between the input bus to the time slots on the output bus shifted one time slot later in time, and (iii) repeating step (ii) until bit order of time slots within a frame of data between the input and the output bus is preserved.

3. A time slot assigner as defined in claim 3 including means for loading said bytes of incoming data into said storing means during a first half of a channel interval, and means for reading data from said storing means during a second half of the channel interval.

4. A time slot assigner for a digital data switching system comprising:

(a) means for receiving serial data on an input bus divided into frames of time slots, (b) means for connecting each time slot of data into parallel bytes corresponding to data channels, (c) means for storing each byte in a cycling frame memory at locations related to channel numbers of said data, (d) means for subsequently reading selectable ones of said locations corresponding to time slot numbers of data on an output bus, said selectable ones of said locations being determined by i) determining the order of time slots of data in an input frame, ii) determining whether each time slot of data in an input frame is to be located in the same or later time slot in an output frame, or whether it is to be located in an earlier time slot in said output frame to maintain the same said order of time slots, (iii) in the event each time slot of data of the input frame is to be located in the same or in a later time slot in an output frame to maintain the same said order, applying each time slot of data of the input frame to the same or a later time slot in the output frame, (iv) in the event a time slot of data of the input frame is to be located in an earlier time slot in an output frame to maintain the same said order, delaying for one time slot interval and then applying each time slot of data of the input frame to the same or to a later time slot in the output frame, whereby the order of time slots in a stream of output data is always from an earlier time slot to a later time slot.

* * * * *

UNITED STATES PATENT AND TRADEMARK OFFICE
CERTIFICATE OF CORRECTION

PATENT NO. : 6,259,703 B1
DATED : July 10, 2001
INVENTOR(S) : Thomas Gray

It is certified that error appears in the above-identified patent and that said Letters Patent is hereby corrected as shown below:

Column 2,
Line 22, delete "first of each" insert -- first bit of each --
Lines 23 and 24, delete "constant delay" insert -- preservation of bit order --
Line 28, delete "preservation of bit order" insert -- preserved bit order --
Line 64, delete "would be again be" insert -- would again be --

Column 3,
Line 45, delete "there is bit order is preserved" insert -- there is bit order preserved --

Column 4,
Line 63, delete "lands" insert -- 1 and 5 --
Line 64, delete "and bus parallel 3" insert -- and parallel bus 3 --

Column 5,
Line 17, delete "frame-of data." insert -- frame of data. --

Column 6,
Line 57, delete "tome slot" insert -- time slot --

Signed and Sealed this

Twenty-sixth Day of March, 2002

Attest:

*Attesting Officer*

JAMES E. ROGAN
*Director of the United States Patent and Trademark Office*